US012352432B2

(12) United States Patent
Zheng

(10) Patent No.: US 12,352,432 B2
(45) Date of Patent: *Jul. 8, 2025

(54) PELLET BURNER

(71) Applicant: Shenzhen Asmoke Technology Co., Ltd., Guangdong (CN)

(72) Inventor: Ying Zheng, Jiaxing (CN)

(73) Assignee: Shenzhen Asmoke Technology Co., Ltd., Shenzhen (CN)

( * ) Notice: Subject to any disclaimer, the term of this patent is extended or adjusted under 35 U.S.C. 154(b) by 802 days.

This patent is subject to a terminal disclaimer.

(21) Appl. No.: 17/647,282

(22) Filed: Jan. 6, 2022

(65) Prior Publication Data

US 2022/0214040 A1 Jul. 7, 2022

(30) Foreign Application Priority Data

Jan. 7, 2021 (CN) .......................... 202110016765.4

(51) Int. Cl.
*F24B 1/02* (2006.01)
*A47J 37/07* (2006.01)
(Continued)

(52) U.S. Cl.
CPC ........... *F23B 50/12* (2013.01); *A47J 37/0704* (2013.01); *F24B 5/06* (2013.01); *F24B 13/006* (2013.01);
(Continued)

(58) Field of Classification Search
CPC .......... F23B 50/12; F23B 60/02; F23B 40/00; F23B 2700/023; F23L 1/00; A47J 37/07;
(Continued)

(56) References Cited

U.S. PATENT DOCUMENTS 5,617,841 A * 4/1997 Whitfield .................. F23B 1/00
126/152 B
2008/0066731 A1* 3/2008 Johnson .................. F23B 50/12
126/73
(Continued)

FOREIGN PATENT DOCUMENTS

CN 2419540 Y 2/2001
CN 202813454 U 3/2013
(Continued)

OTHER PUBLICATIONS

Machine Translation of CN 206247401 (Year: 2017).*
Extended European search report issued in corresponding EP Application No. 21917104.8 dated Oct. 28, 2024 (6 pages).

*Primary Examiner* — Steven B McAllister
*Assistant Examiner* — Amy E Carter
(74) *Attorney, Agent, or Firm* — Osha Bergman Watanabe & Burton LLP

(57) ABSTRACT

A pellet burner includes: a burner body having a combustion chamber and an open top; a feed opening at a sidewall of the burner body; a through port under the burner body; and a grate structure above the through port and including two tiers of supports both secured to the burner body. Supports in the first tier are lower than the adjacent supports in the second tier. The second tier of supports are staggered with the first tier. A passage is between the two tiers of supports. The passage is narrower than a diameter D of the pellet fuel. A spacing between two adjacent supports in the second tier is greater than D but smaller than 2D. The feed opening is above the grate structure by no less than 3D. The pellet fuel drops from the feed opening. Air entering via the through port disperses the burnt pellet fuel ash.

10 Claims, 5 Drawing Sheets

(51) Int. Cl.
*F23B 50/12* (2006.01)
*F24B 5/06* (2006.01)
*F24B 13/00* (2006.01)
*F24B 13/02* (2006.01)
*F24B 1/20* (2006.01)

(52) U.S. Cl.
CPC ........ *F24B 13/02* (2013.01); *F23B 2700/023* (2013.01); *F24B 1/207* (2013.01)

(58) Field of Classification Search
CPC .......... F23H 1/06; F23H 13/00; F24B 13/008; F24B 13/02
USPC ........ 126/25 R, 245, 242; 110/268, 290, 292
See application file for complete search history.

(56) References Cited

U.S. PATENT DOCUMENTS

2010/0242941 A1* 9/2010 Palmer .................... F23H 13/00
126/163 R
2014/0318524 A1* 10/2014 Measom ............. A47J 37/0704
126/25 R

FOREIGN PATENT DOCUMENTS

| | | | |
|---|---|---|---|
| CN | 206247401 U | * | 6/2017 |
| CN | 108865283 A | | 11/2018 |
| CN | 112617629 A | | 4/2021 |
| CN | 112856386 A | | 5/2021 |
| CN | 112856387 A | | 5/2021 |
| CN | 112856389 A | | 5/2021 |
| CN | 112856390 A | | 5/2021 |
| DE | 202005007927 U1 | | 7/2005 |

* cited by examiner

PELLET BURNER

FIELD

Embodiments of the present disclosure relate to the field of combustion apparatuses, and more particularly relate to a pellet burner.

BACKGROUND

For conventional pellet stoves, e.g., barbecue stoves, a burner adopted basically has an enclosed bottom structure. Such a structure is very inconvenient to cleanse because after each use, the burnt pellet fuel ash has to be cleaned with a suction cleaner, rendering a poor user experience. Consider a heating stove as another example, which is generally configured with a layer of grate for holding fallen ash. However, as biomass pellet fuel usually has a cylindrical structure extruded from biomass raw materials, with a diameter of about 4-6 mm and a length ranging from 1 cm to 6 cm, and without an external force applied, the burnt pellet fuel ash would still maintain the original cylindrical shape, the ash hardly collapses down autonomously, rendering a poor ash falling efficiency and effect. After the combustion has lasted for a relatively long time, additional means is needed to break the ash loose so as to facilitate clearing the ash. Such additional means leads to a complex structure and increases the manufacturing cost. Furthermore, conventional pellet stoves need user involvement, inconvenient to use.

SUMMARY

The present disclosure provides a pellet burner, which enables automatic ash falling without user involvement in clearing the ash and offers a good ash falling effect.

Embodiments of the present disclosure provide: a pellet burner, comprising: a burner body having a combustion chamber, a top of the burner body being open; and a feed opening provided at a first sidewall of the burner body, wherein a through port for air intake and ash falling is provided at an underside of the burner body, wherein a grate structure supporting pellet fuel is provided above the through port, the grate structure comprising a first tier of supports and a second tier of supports, the first tier of supports and the second tier of supports being secured to the burner body, wherein supports in the first tier are disposed lower than the adjacent supports in the second tier, and the second tier of supports are staggered with the first tier of supports in a vertical direction, wherein a first passage for ash falling and air intake is provided between the first tier of supports and the second tier of supports, wherein a width of the first passage is smaller than a diameter D of the pellet fuel, and a spacing L2 between two adjacent supports in the second tier is greater than D but smaller than 2D, and wherein the feed opening is disposed above the grate structure with a height difference H, H being no less than 3D; the pellet fuel drops from the feed opening to strike loose burnt pellet fuel ash, and air entering from the through port disperses the burnt pellet fuel ash between adjacent first and second tiers of supports.

Furthermore, the first tier of supports and the second tier of supports extend in a direction vertical to feed direction of the feed opening, a spacing L1 between two adjacent supports in the first tier gradually increases from a side portion where the feed opening is located towards an opposite side portion, and the spacing L2 between two adjacent supports in the second tier gradually increases from the side portion where the feed opening is located towards the opposite side portion.

Furthermore, the first tier of supports and the second tier of supports are inclined downward from a side portion where the feed opening is located towards an opposite side portion.

Furthermore, the burner body comprises an open bottom that forms the through port.

Furthermore, a mounting port for mounting an igniter is provided at the first sidewall of the burner body, wherein the feed opening, the mounting port, and the grate structure are sequentially arranged from top to down, and a spacing from the feed opening to the mounting port is greater than spacing from the mounting port to the grate structure.

Further, a middle air inlet is further provided at the first sidewall of the burner body, the middle air inlet being disposed no lower than the mounting port and no higher than the feed opening, or an upper air inlet is further provided at the first sidewall of the burner body, the upper air inlet being disposed no lower than the feed opening.

Furthermore, the first tier of supports and the second tier of supports are bars. or the grate structure is formed by an undulated sheet metal element, the first tier of supports are formed at valleys of the undulated sheet metal element, the second tier of supports are formed at peaks of the undulated sheet metal element, and through holes forming the first passages are provided between the valleys and the peaks of the undulated sheet metal element.

Furthermore, auxiliary supports for sustaining bottom fire are provided under the first tier of supports, wherein the auxiliary supports are disposed higher than the through port, and the auxiliary supports are located at a side below the feed opening and cover an area not exceeding ½ of an area covered by the grate structure.

Furthermore, the burner body comprises a second sidewall and a third sidewall which are disposed at two sides of the first sidewall, respectively, wherein the second sidewall and the third sidewall are extended into a splayed configuration towards two sides along a feed direction of the feed opening.

Further, the first tier of supports and the second tier of supports are parallel to the feed direction of the feed opening, and the burner body further comprises a fourth sidewall connected with the second sidewall, a fifth sidewall connected with the third sidewall, and a sixth sidewall connected to the fourth sidewall and the fifth sidewall. The fourth sidewall and the fifth sidewall are parallel to the first tier of supports and the second tier of supports, and the sixth sidewall is vertical to the feed direction of the feed opening.

With the above technical solutions, the present disclosure offers the following advantages:

The grate structure is configured for supporting pellet fuel. The width of the first passage is smaller than the diameter D of the pellet fuel. Further, as the spacing L2 between two adjacent supports in the second tier is greater than D but smaller than 2D, the pellet fuel surely enters between the two adjacent supports in the second tier, instead of directly falling off from the first passage; moreover, as the pellet fuel first entering between two adjacent supports in the second tier surely holds the pellet fuel above aerially, it is hard for two pieces of pellet fuel to enter abreast between two adjacent supports in the second tier, which increases contact area between the pellet fuel and air, thereby effectively enhancing combustion efficiency. Experiments measured that 25% fuel could be saved. Further, because the pellet fuel is burnt from bottom to top, the pellet fuel between two adjacent supports in the second tier is first burnt to ash; therefore, to enhance ash falling efficiency: first, by disposing the feed opening above the grate structure with a height difference H being no less than 3D, pellet fuel, when being fed into the combustion chamber, surely rolls downward under gravity and strikes against the burning pellet fuel; further, because it is impossible for two pieces of pellet fuel to enter abreast between two adjacent supports in the second tier while there is surely further pellet fuel above contacting with and pressing against the lower piece between two adjacent supports in the second tier, the acting force generated by subsequent feeding of pellet fuel into the combustion chamber is finally transmitted to the burnt pellet fuel ash between two adjacent supports in the second tier to thereby break the ash loose. Second, the through port serves for high-throughput air intake, which avoids build-up of the ash at the bottom of the burner; further, the air flowing upwards through the first passage disperses the burnt pellet fuel ash between the adjacent first and second tiers of supports; and once the ash is dispersed, the pellet fuel above automatically drops, such that there is no space to maintain the ash at the current position and the ash falls off via the first passage. In view that the ash and the air move in opposite directions where the ash falls downwards while the air flows upwards, to avoid mutual interference, the second tier of supports are arranged stagger with the first tier of supports in the vertical direction, i.e., the second tier of supports and the first tier of supports do not completely overlap in the vertical direction; the first passage so formed is cant. Air passing through two opposite first passages blows in opposite directions to disperse the ash; in addition to the impedance by the pellet fuel above, the airflow does not suffice to provide a lift force supporting the ash to overcome the gravity from falling, and in further addition to the pallet fuel falling from above which squeezes the space where the ash was previously occupied, the ash is enabled to continuously fall down, so on and so forth, realizing automatic, efficient ash falling in the pellet burner, and yielding a good ash falling effect. Moreover, as the efficient ash falling is achieved by cooperation between feed and air intake, no additional means is needed to facilitate ash clearing, which not only lowers the manufacturing cost, but also eliminates user involvement, thereby remarkably improving user experience.

BRIEF DESCRIPTION OF THE SEVERAL VIEWS OF THE DRAWINGS

Hereinafter, the present disclosure will be further illustrated with reference to the accompanying drawings.

DETAILED DESCRIPTION

Figure 1:
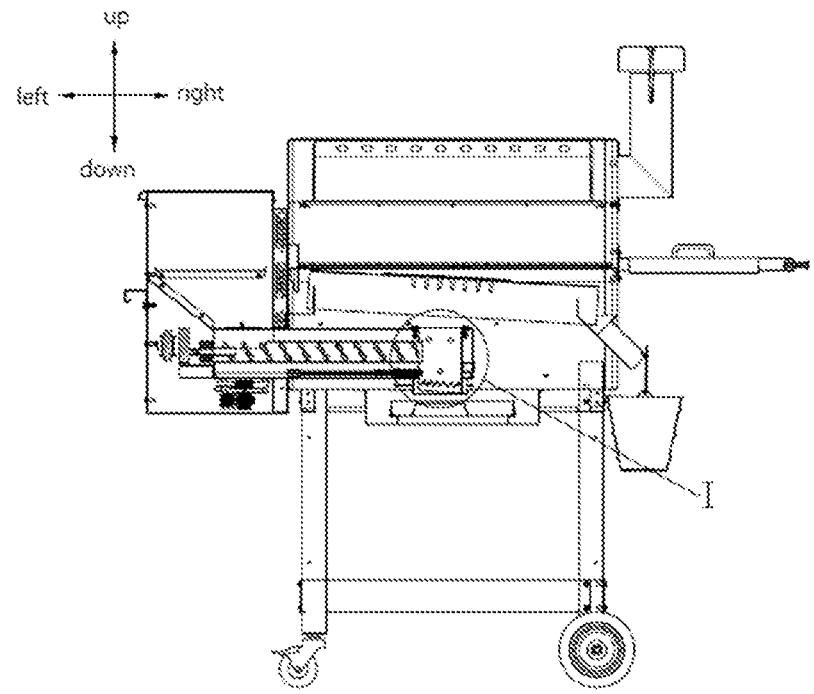
FIG. 1 shows a schematic diagram of a pellet burner applied in a barbecue stove according to a first embodiment of the present disclosure.
Figure 2:
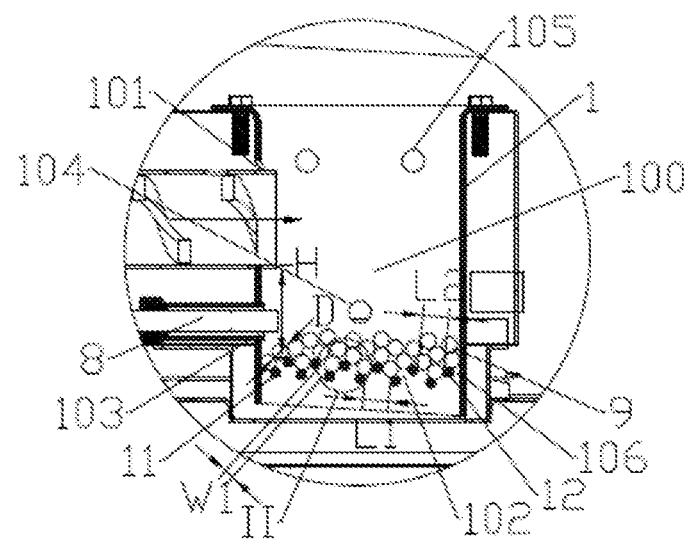
FIG. 2 is an enlarged view of part I in FIG. 1.
Figure 3:
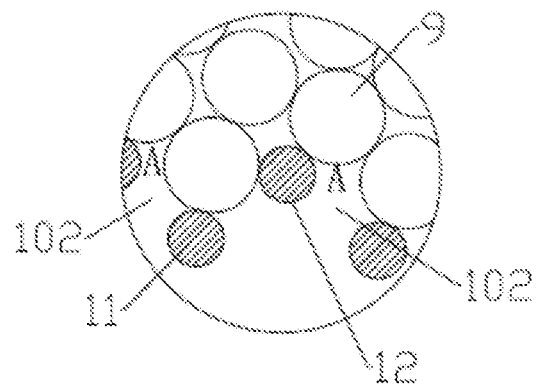
FIG. 3 is an enlarged view of part II in FIG. 2.

It is briefly noted that the pellet fuel mentioned herein refers to cylindrical pellets extruded from biomass raw materials such as wood waste, and the pellet fuel applicable to a pellet burner with a fixed size has a substantially fixed diameter.

First Embodiment

As shown in FIGS. 1-6, a pellet burner is provided, comprising: a burner body 1 having a combustion chamber 100, the top of the burner body 1 being open; and a feed opening 101 provided at a sidewall of the burner body 1; wherein a grate structure supporting pellet fuel 9 is provided at the bottom of the burner body 1, the grate structure including a first tier of supports 11 and a second tier of supports 12, the first tier of supports 11 and the second tier of supports 12 being secured to the burner body 1, wherein supports 11 in the first tier are disposed lower than adjacent supports 12 in the second tier, the second tier of supports 12 are arranged stagger with the first tier of supports 11 in the vertical direction, first passages 102 for ash falling and air intake are provided between the first tier of supports 11 and the second tier of supports 12, wherein width W1 of the first passage 102 is smaller than diameter D of the pellet fuel 9, and spacing L2 between two adjacent supports 12 in the second tier is greater than D but smaller than 2D; and wherein the feed opening 101 is located above the grate structure with a height difference H, H being no less than 3D; the pellet fuel drops from the feed opening 101 to strike loose the burnt pellet fuel ash, and the bottom opening of the burner body 1 serves for air inlet to disperse the burnt pellet fuel ash between the adjacent first and second tiers of supports 11, 12.

In the present disclosure, the grate structure is configured for supporting pellet fuel. The width of the first passage is smaller than the diameter D of the pellet fuel. Furthermore, as the spacing L2 between two adjacent supports in the second tier is greater than D but smaller than 2D, the pellet fuel surely enters between the two adjacent supports in the second tier, instead of directly falling off from the first passage; moreover, as the pellet fuel first entering between two adjacent supports in the second tier surely holds the pellet fuel above aerially, as shown at part A in FIG. 3, it is hard for two pieces of pellet fuel to enter abreast between two adjacent supports in the second tier, which increases contact area between the pellet fuel and air, thereby effectively enhancing combustion efficiency. Experiments measured that 25% fuel could be saved. Furthermore, because the pellet fuel is burnt from bottom to top, the pellet fuel between two adjacent supports in the second tier is first burnt to ash; therefore, to enhance ash falling efficiency: first, by disposing the feed opening above the grate structure with a height difference H being no less than 3D, the pellet fuel, when being fed into the combustion chamber, surely rolls downwards under gravity and strikes against the burning pellet fuel; furthermore, because it is impossible for two pieces of pellet fuel to enter abreast between two adjacent supports in the second tier while there is surely further pellet fuel above contacting with and pressing against the lower piece between two adjacent supports in the second tier, the acting force generated by subsequent feeding of pellet fuel into the combustion chamber is finally transmitted to the burnt pellet fuel ash between two adjacent supports in the second tier to thereby break the ash loose. Second, the through port serves for high-throughput air intake, which avoids build-up of the ash at the bottom of the burner; furthermore, the air flowing upwards through the first passage disperses the burnt pellet fuel ash between the adjacent first and second tiers of supports; and once the ash is dispersed, the pellet fuel above automatically drops, such that there is no space to maintain the ash at the current position and the ash falls off via the first passage. In view that the ash and the air move in opposite directions where the ash falls downwards while the air flows upwards, to avoid mutual interference, the second tier of supports are arranged stagger with the first tier of supports in the vertical direction, i.e., the second tier of supports and the first tier of supports do not completely overlap in the vertical direction; the first passage so formed is cant. Air passing through two opposite first passages blows in opposite directions to disperse the ash; in addition to the impedance by the pellet fuel above, the airflow does not suffice to provide a lift force supporting the ash to overcome the gravity from falling, and in further addition to the pallet fuel falling from above which squeezes the space where the ash was previously occupied, the ash is enabled to continuously fall down, so on and so forth, realizing automatic, efficient ash falling in the pellet burner, and yielding a good ash falling effect. Moreover, as the efficient ash falling is achieved by cooperation between feed and air intake, no additional means is needed to facilitate ash clearing, which not only lowers the manufacturing cost, but also eliminates user involvement, remarkably improving user experience. The first tier of supports 11 and the second tier of supports 12 extend in a substantially consistent direction, but certain inclination therebetween is allowed, as long as the inclination satisfies the above size requirement to allow the pellet fuel first entering the combustion chamber to fall onto the first tier of supports 11 to guarantee the ash falling effect. Likewise, to guarantee ash falling efficiency and effect, the through port should not be too small; in this embodiment, the bottom of the burner body is directly designed to be open to form the through port, which may achieve a good ash falling efficiency and effect.

Figure 4:
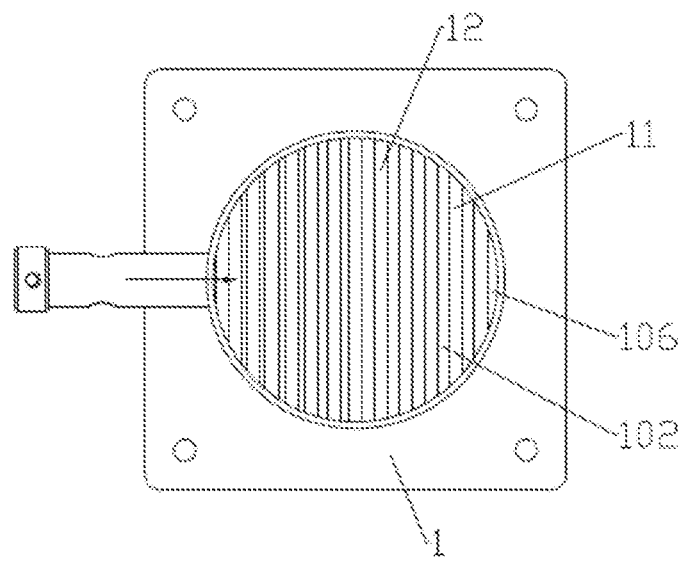
FIG. 4 shows a bottom view of the pellet burner in the first embodiment of the present disclosure.
Figure 5:
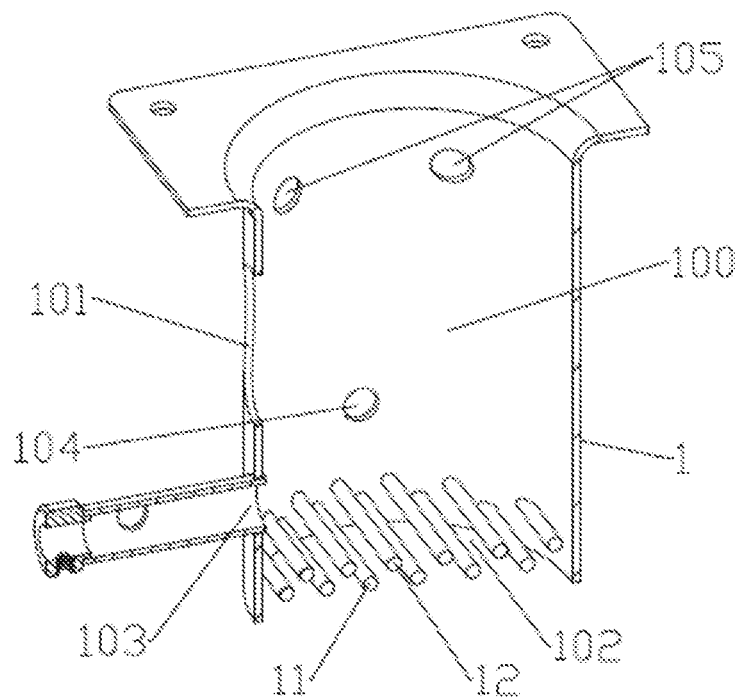
FIG. 5 shows a sectional view of the pellet burner according to the first embodiment of the present disclosure.
Figure 6:
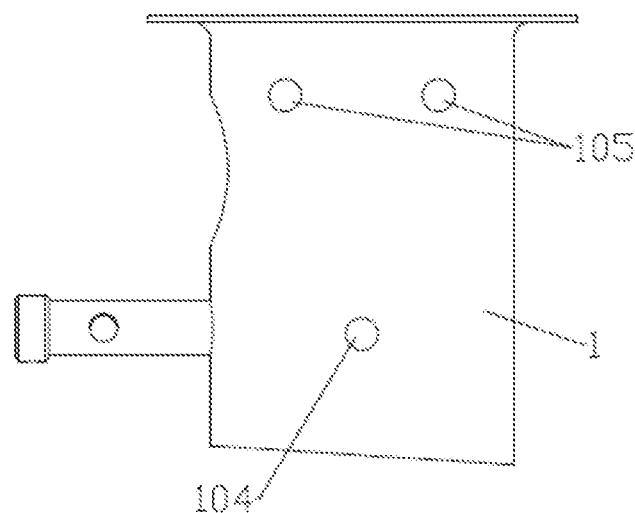
FIG. 6 shows a front view of the pellet burner according to the first embodiment of the present disclosure.

In this embodiment, to render a more uniform distribution of the pellet fuel 9 falling onto the grate structure, the extended directions of the first tier of supports 11 and second tier of supports 12 may be arranged to be vertical to feed direction of the feed opening 101 (referring to the directions indicated by the arrows in FIGS. 2 and 4); specifically, the projections of the extended directions are vertical to the projection of the feed direction in a horizontal plane, as shown in FIG. 4; it may also be designed that spacing L1 between two adjacent supports 11 in the first tier gradually increases from the side portion where the feed opening 101 is located towards the opposite side portion, and spacing L2 between two adjacent supports 12 in the second tier gradually increases from the side portion where the feed opening 101 is located towards the opposite side portion; as such, a position farther from the feed opening 101 is not easily piled with pellet fuel, and thus the combustion chamber can receive more pellet fuel, and the pellet fuel 9 entering later can move towards the position distant from the feed opening 101, rendering a relatively uniform distribution of the pellet fuel 9 in the combustion chamber 100, which facilitates enhancement of the combustion efficiency and effect.

Alternatively, the first tier of supports 11 and the second tier of supports 12 may be arranged to tilt downwards from the side portion where the feed opening 101 is located towards the opposite side portion; as such, the pellet fuel 9 entering the combustion chamber 100 later moves more easily towards the side portion distant from the feed opening 101; in this way, the pellet fuel 9 is distributed relatively uniformly in the combustion chamber 100. The pellet fuel 9 can be stacked layer by layer, and there can have a certain aerial space between layers, which can also increase the contact area between the pellet fuel 9 and the air, rendering a more sufficient combustion; as such, a high combustion efficiency is achieved and the pellet fuel 9 is saved; besides, the pellet fuel 9 entering the combustion chamber 100 later is facilitated to fall onto the ash of the burnt pallet fuel 9 below, which improves ash falling. The inclined distribution results in that the second tier of supports 12 at the utmost right of FIG. 2 may be lower than the first tier of supports 12 at the utmost left, which, however, does not affect actual applications, because it still satisfies the previously mentioned configuration: the supports 11 in the first tier are disposed lower than adjacent supports 12 in the second tier.

Figure 9:
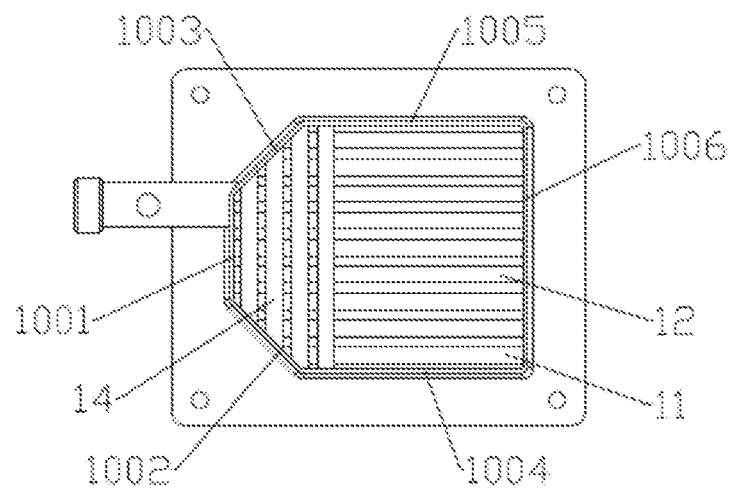
FIG. 9 shows a bottom view of the pellet burner in the third embodiment of the present disclosure.

The above two manners of arranging the first tier of supports 11 and second tier of supports 12 may be applied jointly or separately. It is understood that the first tier of supports 11 and the second tier of supports 12 extend in a direction inclined relative to the feed direction of the feed opening 101 or in a direction parallel to the feed direction of the feed opening 101. FIG. 9 shows an example that the extension directions are parallel to the feed direction of the feed opening 101. Any arrangement manner taught from the above two manners is allowed, which also renders a good combustion efficiency and effect.

A mounting port 103 for mounting an igniter 8 is provided at a sidewall of the burner body 1, wherein the feed opening 101, the mounting port 103, and the grate structure are sequentially arranged from top to down, and spacing from the feed opening 101 to the mounting port 103 is greater than spacing from the mounting port 103 to the grate structure. In this way, the flame ignited by the igniter becomes closer to the grate structure, causing the bottom pellet fuel 9 to burn first.

To enable a more sufficient burning of the pellet fuel 9, a middle air inlet 104 may be further provided at a sidewall of the burner body 1, the middle air inlet 104 being disposed no lower than the mounting port 103 and no higher than the feed opening 101, i.e., allowing the air to be blown to the burning pellet fuel 9, playing a role of promoting combustion. A plurality of middle air inlets 104 may be arranged symmetrically along the circumference of the burner body 1, which offers a better combustion promotion effect. For the sake of secondary combustion promotion, an upper air inlet 105 is further provided at a sidewall of the burner body 1, the upper air inlet 105 being no lower than the feed opening 101. The flame of the burning pellet fuel 9 contains CO. Air introduced via the upper air inlet 105 promotes CO combustion, rendering a more efficient combustion; besides, a plurality of upper air inlets 105 may be provided along the circumference of the burner body 1, wherein the number of upper air inlets 105 is more than that of the middle air inlets 104, thereby forming a wind curtain to block the ash inside the combustion chamber 100 from flying up with the flame.

In this embodiment, the first tier of supports 11 and the second tier of supports 12 are bars. The bars may select typical round bars or square bars; in addition to the straight bars selected in this embodiment, curved bars may also be selected. The first tier of supports 11 and the second tier of supports 12 may be directly welded to the burner body 1 or secured to the burner body 1 via other conventional securing manners; alternatively, they may be secured to a transition sleeve, and then the transition sleeve is secured to the burner body 1. Furthermore, as the first tier of supports 11 and the second tier of supports 12 are bars, a gap 106 exists between the first and tiers of supports 11, 12 and the inner sidewall of the burner 1, wherein width size of the gap 106 satisfies a requirement of not allowing the pellet fuel to directly pass through, i.e., less than D.

Second Embodiment

Figure 7:
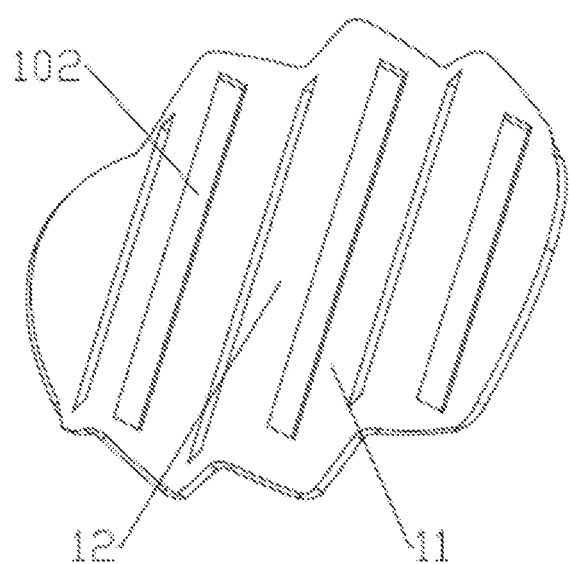
FIG. 7 shows a structural schematic diagram of a grate structure according to a second embodiment of the present disclosure.

As shown in FIG. 7, the grate structure is formed by an undulated sheet metal element, wherein the first tier of supports 11 are formed at valleys of the undulated sheet metal element, the second tier of supports 12 are formed at peaks of the undulated sheet metal element, and through holes forming the first passages 102 are provided between the valleys and peaks of the undulated sheet metal element. The outer profile of the sheet metal element is adapted to the inner sidewall of the burner body 1, such that the spacing 106 mentioned in the first embodiment may not be present. To avoid build-up of the ash on the first tier of supports, the upper surfaces of the first tier of supports may be preferably designed as a convex arched surface.

Other contents that have not been described in this embodiment may refer to the first embodiment.

Third Embodiment

Figure 8:
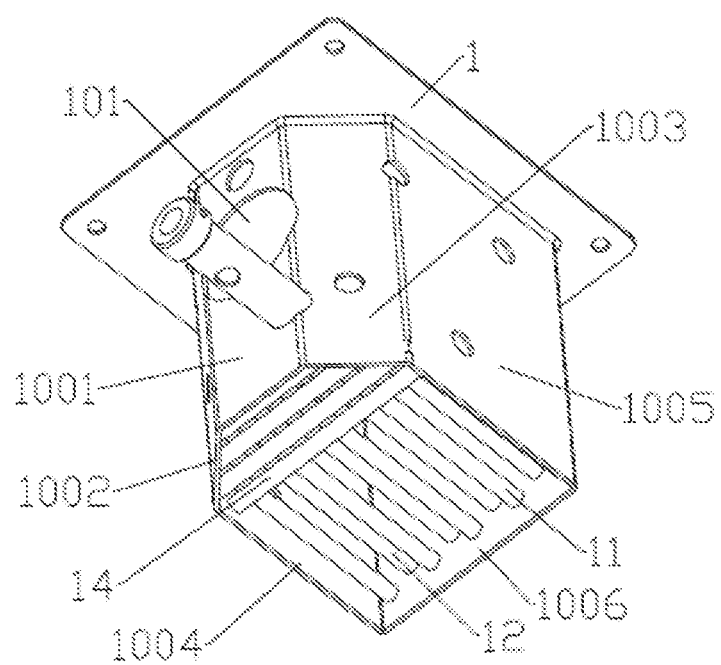
FIG. 8 shows a schematic view of the pellet burner according to a third embodiment of the present disclosure.

As illustrated in FIGS. 8 and 9, auxiliary supports 14 for sustaining bottom fire are provided under the first tier of supports 11, wherein the auxiliary supports are disposed higher than the through port, the auxiliary supports 14 are located at a side below the feed opening 101 and cover an area not exceeding ½ of the area covered by the grate structure. The ½ here is only an approximate number, which allows a deviation, and any value not affecting normal ash falling and air intake is allowed. The addition of auxiliary supports 14 offers two functions: on one hand, in cases of high burn, the ash falling efficiency and air intake amount at a position below the feeding port 101 may be reduced so as to effectively control combustion efficiency of the pellet fuel at that position, thereby effectively avoiding occurrence of backfire at the feed opening 101; and on the other hand, in cases of low burn, the bottom fire is sustained to avoid extinction. In this embodiment, the auxiliary supports 14 adopt a bar structure, such that a certain gap is also provided between adjacent auxiliary supports 14 for air intake, which promotes combustion while sustaining the bottom fire.

In this embodiment, the first tier of supports 11 and the second tier of supports 12 are parallel to feed direction of the feed opening 101, while the auxiliary supports 14 are vertical to the first tier of supports 11 and the second tier of supports 12. Alternatively, the auxiliary supports 14 may be arranged inclined relative to the first tier of supports 11 and the second tier of supports 12. In practical applications, the auxiliary supports 14 may also be of a net structure or a perforated plate structure; if the auxiliary supports 14 do not have a large coverage, a non-perforated plate may also be adopted. The auxiliary supports 14 may also be arranged in a freely removable manner, i.e., mounted in the burner body 1 when needed, and removed when not needed.

Besides the cylindrical shape, the burner body 1 may also be designed as a hollow prismatic shape shown in this embodiment. Specifically, the burner body 1 comprises a first sidewall 1001 where a feed opening 101 is provided, a second sidewall 1002 and a third sidewall 1003 which are respectively disposed at two sides of the first sidewall 1001, wherein the second sidewall 1002 and the third sidewall 1003 are extended into a splayed configuration towards two sides along the feed direction. The splayed configuration of the second sidewall 102 and the third sidewall 1003 may prevent the pellet fuel from building up under the feed opening 101, thereby better preventing backfire at the feed opening 101. In view that the first tier of supports 11 and the second tier of supports 12 are parallel to the feed direction of the feed opening 101, to effectively utilize the spacings between the sidewalls of the burner body 1 and the first and second tiers of supports 11, 12, the burner body 1 further comprises a fourth sidewall 1004 connected with the second sidewall 1002, a fifth sidewall 1005 connected with the third sidewall 1003, and a sixth sidewall 1006 connected with the fourth sidewall 1004 and the fifth sidewall 1005, respectively; wherein the fourth sidewall 1004 and the fifth sidewall 1005 are parallel to the first tier of supports 11 and the second tier of supports 12; the spacings respectively between the fourth and fifth sidewalls 1004, 1005 and the first and second tier of supports 11, 12 have a uniform width size to facilitate air intake and ash falling, while the sixth sidewall 1006 is vertical to the feed direction of the feed opening 101, such that after the pellet fuel strikes against the sixth sidewall 1006, it is more easily rebounded to fall between adjacent supports 12 in the second tier.

Other contents that have not been described in this embodiment may refer to the previous embodiments.

Forth Embodiment

Figure 10:
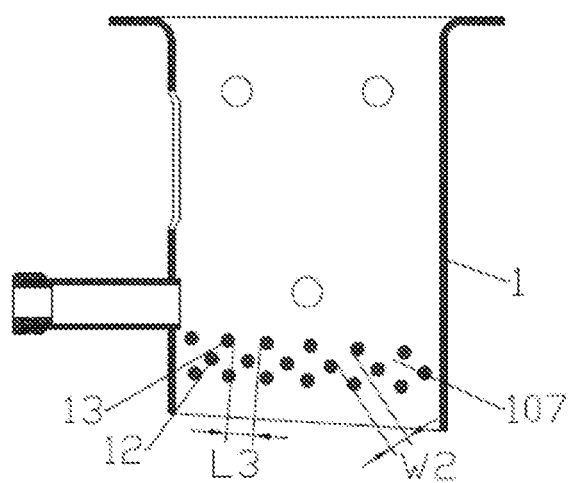
FIG. 10 shows a sectional view of a pellet burner according to the fourth embodiment of the present disclosure.

In addition to arrangement of two tiers of supports, more tiers may be added. As shown in FIG. 10, the grate structure further comprises a third tier of supports 13 secured to the burner body 1, the third tier of supports 13 being disposed higher than the second tier of supports 12; and second passages 107 are present between the third tier of supports 13 and the second tier of supports 12, width W2 of the second passage 107 being less than D, spacing L3 between two adjacent supports 13 in the third tier being greater than D but smaller than 2D. It is understood that more tiers of supports may be provided based on actual needs.

Other contents that have not been described in this embodiment may refer to the previous embodiments.

The parallel, vertical, inclined, and crossed mentioned herein refer to relationships between projections of corresponding structures on the same plane, while parallel and vertical are not absolute requirements, where a certain offset is allowed. Besides the preferred embodiments above, the present disclosure also has other embodiments. Those skilled in the art may make various variations and alternations based on the present disclosure, and such variations and alterations should fall within the scope defined by the claims appended without departing from the spirit of the present disclosure.

What is claimed is:
1. A pellet burner, comprising:
   a burner body having a combustion chamber, a top of the burner body being open; and
   a feed opening provided at a first sidewall of the burner body,
   wherein a through port for air intake and ash falling is provided at an underside of the burner body,
   wherein a grate structure supporting pellet fuel is provided above the through port, the grate structure comprising a first tier of supports and a second tier of supports, the first tier of supports and the second tier of supports being secured to the burner body, wherein supports in the first tier are disposed lower than the adjacent supports in the second tier, and the second tier of supports are staggered with the first tier of supports in a vertical direction, wherein a first passage for ash falling and air intake is provided between the first tier of supports and the second tier of supports, wherein a width of the first passage is smaller than a diameter D of the pellet fuel, and a spacing L2 between two adjacent supports in the second tier is greater than D but smaller than 2D, and wherein the feed opening is disposed above the grate structure with a height difference H, H being no less than 3D, such that the pellet fuel drops from the feed opening to strike loose burnt pellet fuel ash, and air entering via the through port disperses the burnt pellet fuel ash between adjacent first and second tiers of supports.

2. The pellet burner according to claim 1, wherein the first tier of supports and the second tier of supports extend in a direction vertical to a feed direction of the feed opening, a spacing L1 between two adjacent supports in the first tier gradually increases from a side portion where the feed opening is located towards an opposite side portion, and the spacing L2 between two adjacent supports in the second tier gradually increases from the side portion where the feed opening is located towards the opposite side portion.

3. The pellet burner according to claim 1, wherein the first tier of supports and the second tier of supports are inclined downward from a side portion where the feed opening is located towards an opposite side portion.

4. The pellet burner according to claim 1, wherein the burner body comprises an open bottom that forms the through port.

5. The pellet burner according to claim 1, wherein a mounting port for mounting an igniter is provided at the first sidewall of the burner body, wherein the feed opening, the mounting port, and the grate structure are sequentially arranged from top to down, and wherein a spacing from the feed opening to the mounting port is greater than a spacing from the mounting port to the grate structure.

6. The pellet burner according to claim 5, wherein a middle air inlet is further provided at the first sidewall of the burner body, the middle air inlet being disposed no lower than the mounting port and no higher than the feed opening, or wherein an upper air inlet is further provided at the first sidewall of the burner body, the upper air inlet being disposed no lower than the feed opening.

7. The pellet burner according to claim 1, wherein the first tier of supports and the second tier of supports are bars, or wherein the grate structure is formed by an undulated sheet metal element, the first tier of supports is formed at valleys of the undulated sheet metal element, the second tier of supports are formed at peaks of the undulated sheet metal element, and through holes forming the first passage are provided between the valleys and the peaks of the undulated sheet metal element.

8. The pellet burner according to claim 1, wherein auxiliary supports for sustaining bottom fire are provided under the first tier of supports, wherein the auxiliary supports are disposed higher than the through port, and wherein the auxiliary supports are located at a side below the feed opening and cover an area not exceeding ½ of an area covered by the grate structure.

9. The pellet burner according to claim 8, wherein the burner body comprises a second sidewall and a third sidewall which are disposed at two sides of the first sidewall, respectively, and wherein the second sidewall and the third sidewall are extended into a splayed configuration towards two sides along a feed direction of the feed opening.

10. The pellet burner according to claim 9, wherein the first tier of supports and the second tier of supports are parallel to the feed direction of the feed opening, wherein the burner body further comprises a fourth sidewall connected with the second sidewall, a fifth sidewall connected with the third sidewall, and a sixth sidewall connected to the fourth sidewall and the fifth sidewall, and wherein the fourth sidewall and the fifth sidewall are parallel to the first tier of supports and the second tier of supports, and the sixth sidewall is vertical to the feed direction of the feed opening.

\* \* \* \* \*